(12) United States Patent
Jackson

(10) Patent No.: US 6,487,348 B1
(45) Date of Patent: Nov. 26, 2002

(54) VARIABLE FIBER COUNT OPTICAL FIBER CABLE CORE

(75) Inventor: Kenneth W. Jackson, Snellville, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/438,685

(22) Filed: Nov. 12, 1999

(51) Int. Cl.[7] .................................................. G02B 6/44

(52) U.S. Cl. ..................... 385/114; 385/104; 385/107; 385/110; 385/111

(58) Field of Search ................................ 385/102, 104, 385/105, 110, 111, 114, 107

(56) References Cited

U.S. PATENT DOCUMENTS

| | | | |
|---|---|---|---|
| 4,900,126 A | | 2/1990 | Jackson et al. |
| 4,906,067 A | | 3/1990 | Mayr et al. |
| 5,249,249 A | * | 9/1993 | Eoll et al. ..................... 385/114 |
| 5,524,164 A | * | 6/1996 | Hattori et al. ............... 385/114 |
| 5,787,217 A | * | 7/1998 | Traut et al. .................. 385/106 |
| 5,857,051 A | | 1/1999 | Travieso et al. |
| 5,878,180 A | * | 3/1999 | Nothofer et al. ............ 385/114 |
| 5,905,835 A | | 5/1999 | Bourghelle et al. |
| 6,192,178 B1 | * | 2/2001 | Logan et al. ................ 385/109 |

FOREIGN PATENT DOCUMENTS

| | | | | |
|---|---|---|---|---|
| EP | 0495 241 | * | 12/1991 | ............ G02B/6/44 |
| GB | 2 262 357 A | | 12/1992 | ............ H01B/11/22 |
| JP | 57-017905 | | 1/1982 | ............ G02B/5/16 |

* cited by examiner

Primary Examiner—Hemang Sanghavi
Assistant Examiner—Omar Rojas
(74) Attorney, Agent, or Firm—Needle & Rosenberg, P.C.; Charles H. Fails, Esq.

(57) ABSTRACT

A variable fiber count optical fiber cable core is disclosed. The cable core is intended for use as a part of an optical fiber cable, the optical fiber cable having an elongate cylindrical core tube formed about a longitudinal axis, and within which the cable core is received. The cable core comprises a stack of a plurality of variable fiber count optical fiber units formed about the longitudinal axis of the core tube, and housed therein. The stack of the optical fiber units will comprise at least a first optical fiber unit having a first predetermined number of fibers therein, and at least a second optical fiber unit having a second predetermined number of optical fibers therein, where the first and second predetermined numbers of optical fibers differ from one another within the stack of optical fiber units. So constructed, the number of optical fibers within selected ones of the stack of optical fiber units will be varied dependent on the position of the selected ones of the optical fiber units within the stack of optical fiber units, and so that the stack of optical fiber units takes on the approximate shape of a cylindrical cable core within the cable core tube. Each of the optical fiber units comprised a first predetermined number of optical fibers sub-units joined together, each of the optical fiber sub-units being comprised of a second predetermined number of optical fibers, where both the first and second predetermined numbers of sub-units and optical fibers, respectively, comprise integers.

19 Claims, 3 Drawing Sheets

VARIABLE FIBER COUNT OPTICAL FIBER CABLE CORE

FIELD OF THE INVENTION

The present invention relates in general to optical fiber cables. More particularly, the invention relates to an improved optical fiber cable in which the cable core is comprised of variable fiber count optical fiber units for maximizing the packing density of the cable core, and a method of maximizing the packing density of the cable core.

BACKGROUND OF THE INVENTION

Optical fiber technology, to include the usage of optical fiber cables, has increasingly grown in demand and usage. Optical fiber cables offer the advantage of passing large amounts of data quickly, easily, and with a degree of reliability unmatched by conventional wire data transmission technology. Accordingly as the usage of optical fiber cables increases, it is becoming increasingly difficult to utilize the existing infrastructure to accommodate the demand for increased optical fiber cable capacity. For example, there is only a limited amount of underground duct space currently in existence, and it would be extremely expensive to begin adding additional underground duct space, or duct space in existing buildings, to accommodate the demand for ever greater numbers of fiber optic lines.

For example, limited underground duct space, cable joining costs, and cable manufacturing costs place an economic premium on fiber optic cables with high fiber counts, as well as high fiber packing densities for each measure of cable sheath diameter. For many years, it has been common practice to use a stack of fiber optic ribbons to achieve high fiber counts and packing densities. An example of such an approach to optical fiber cable core construction is illustrated in U.S. Pat. No. 5,878,180 to Nothofer, et al. In the patent to Nothofer et al., an optical fiber cable core is provided with a plurality of superimposed and adjacent stacks of optical fiber ribbons, the stacks of fiber ribbons being arranged over and/or adjacent to each other, and in parallel. As a result, the optical fiber cable core of Nothofer, et al. provides a stack of optical fiber ribbons, in which each of the ribbons has an identical number of optical fiber cables provided as a part thereof.

Other approaches which attempt to maximize the packing density of optical fibers within optical fiber cable cores are disclosed in U.S. Pat. No. 4,906,067 to Mayr, et al., disclosing an optical fiber cable comprised of a plurality of bundled elements, each bundled element having an identical number of optical fibers therein, and in U.S. Pat. No. 5,857,051 to Travieso, et al., which discloses a high density riser and plenum breakout cable for indoor and outdoor cable applications, in which the cable is comprised of optical fiber ribbon structures, the ribbon structures being broken down into four substructures which are stacked within the cable core, and where selected substructures can be broken out of the cable and used where desired.

Ribbon structures of the type utilized in these existing approaches to maximizing the number of optical fibers in an optical fiber cable are disclosed in U.S. Pat. No. 4,900,126 to Jackson, et al., disclosing a bonded array of optical fibers formed as a ribbon; and U.S. Pat. No. 5,905,835 to Bourghelle, et al., disclosing a multi optical fiber ribbon in which two identically sized and shaped ribbons are bounded together for forming one larger ribbon of optical fibers.

One example of a known type of optical fiber cable core configuration which utilizes a stack of optical fiber ribbons, similar to the approach of the patent to Nothofer et al., is illustrated in FIG. 1, which shows in cross-section an optical fiber cable 5 having an elongate continuous core tube 6. Situated within the core tube is a stack 7 of optical fiber ribbons 9, each one of the optical fiber ribbons having an identical number of optical fibers therein. As seen, such a configuration attempts to maximize the packing density of the optical fiber ribbons within the cable core, yet a great amount of free space remains within the cable core. The stack 7 of optical fiber ribbons 9 shown in FIG. 1 is an illustrative configuration only, it being understood that varying square or rectangular stacks of optical fiber ribbons may be present within the core tube, which serves to illustrates the problem, which is that these square or rectangular ribbon stack configurations do not fully utilize the space available within the core tube. It is also understood, although not illustrated in FIG. 1, that the optical fiber cable will be provided with the requisite jacketing, strength members, rip cords and/or water blocking tape which comprise a part of optical fiber cables, as known.

As is known, the maximum number of optical fibers that can be placed within a cable core tube, without incurring excess added loss, is constrained by the dimensions of the stack of optical fibers relative to the inner diameter of the core tube. Specifically, the ratio of the diagonal of the ribbon stack to the core tube inside diameter cannot exceed a predetermined value without inducing excessive cabling and low temperature added optical losses. In the alternative, for a given core tube inner diameter, a minimum clearance between the core tube wall and any optical fiber in the stack may be specified. Although cable cores, such as those disclosed above, comprised of a rectangular stack of optical fiber ribbons offer an attractive solution to the need for maximizing optical fibers within a cable, a rectangular stack of optical fiber ribbons, with each ribbon having a constant fiber count, such as those disclosed in the '180 patent to Nothofer, et al., the '051 patent to Travieso, et al., and the '067 patent to Mayr, et al., do not fully utilize the space available within the cable core for fiber containment, and thus there exists a need for an improved optical fiber cable, more specifically an improved optical fiber cable core, which maximizes the packing density of the optical fibers, or optical fiber units, within the cable core, as well as a method of determining the maximum number of optical fibers that can be packed within a cable core within such structure.

What appears to be needed, then, is a fiber optic cable core having a maximized optical fiber packing density, and a method of maximizing the packing density of optical fiber cable cores.

SUMMARY OF THE INVENTION

The present invention provides an improved optical fiber cable core design, and a method of specifying the maximum number of optical fiber units that can be provided as a part of this improved cable core, which overcomes some of the deficiencies of the known art. This is accomplished by providing a variable fiber count optical fiber cable core in which the number of optical fibers within the optical fiber units are varied, dependent on the position of the optical fiber units within a stack of optical fiber units comprising the optical fiber cable core. This improved optical fiber cable core design provides a simple, efficient, and cost effective cable core, and method of specifying same, heretofore unavailable in the art. Moreover, the relative simplicity of the cable core of this invention, and the method of determining same, when contrasted to the known optical fiber cable core designs, provides a greater degree of reliability, durability, maintainability, and ease of use while simultaneously increasing the optical fiber packing densities per unit of sheath diameter.

This invention attains this improved packing density, as well as providing simplicity in design and ease of use, by providing a variable fiber count optical fiber cable core for use as a part of an optical fiber cable. The optical fiber cable has an elongate cylindrical core tube formed about a longitudinal axis within which the cable core is received. The cable core is comprised of a stack of plurality of variable fiber count optical fiber units formed symmetrically about the longitudinal axis of the core tube. In one preferred embodiment, the optical fiber units may comprise a plurality of optical fiber ribbons.

The variable fiber count optical fiber cable core of this invention comprises at least a first optical fiber unit having a first predetermined number of optical fibers therein, and at least a second stacked optical fiber unit having a second predetermined number of optical fibers therein, where the first and second predetermined numbers of optical fibers differ within the two optical fiber units so that the number of optical fibers are varied within the optical fiber units which comprise the stack of optical fiber units within the cable core. Moreover, the number of optical fibers within selected ones of the plurality of optical fiber units forming the stack of the cable core may be varied dependent on the position of the selected ones of the optical fiber units within the stack of optical fiber units. Additionally, in fashion heretofore unknown in the art, the variable fiber count optical fiber cable core of this invention provides a stack of optical fiber units which are sized and shaped to approximate a cylindrically shaped stack of optical fiber units within the core tube of the optical fiber cable for maximizing the number of optical fibers that can be safely and efficiently packed within the optical fiber cable core.

Also, it is anticipated that at least some of the optical fibers of at least one of the optical fiber units may be colored differently than others of the optical fibers within the same optical fiber unit for ease of identifying the optical fibers, dependent on, for example, the type of optical fiber being used. For example, the optical fibers may comprise multi mode, single mode or match clad optical fibers, the colors being used to identify which optical fibers are present for ease of use during installation and cable splicing.

In the improved optical fiber cable core of this invention, each of the at least a first and a second optical fiber units, respectively, comprises a first predetermined number of optical fiber sub-units joined together as a single optical fiber unit, each of the optical fiber sub-units being comprised of a second predetermined number of optical fibers. The first predetermined number of optical fiber sub-units, and a second predetermined number of optical fibers within each sub-unit each comprise integers. In one preferred embodiment, this second predetermined number of optical fibers for each such sub-unit will be at least two; and in a second embodiment, there will be at least twelve optical fibers within each such optical fiber sub-unit.

Additionally, at least some of the optical fibers within at least one of the optical fibers sub-units may be colored differently than the remainder of the optical fibers within the same sub-unit, and/or the other sub-units which together comprise the optical fiber unit.

A method of maximizing the packing density of an optical fiber cable core is also provided as a part of this invention. The optical fiber cable core is produced by stacking a plurality of optical fiber units within the core tube of the optical fiber cable, while varying the number of optical fibers within selected ones of the plurality of optical fiber units. This step of varying the number of optical fibers within the optical fiber units occurs in response to the position of selected ones of the optical fiber units within the stack of optical fiber units. The method of this invention also includes the step of establishing a first predetermined number optical fiber sub-units within each optical fiber unit, and multiplying this number of optical fiber sub-units by a second predetermined number of optical fibers for each such sub-unit. Both the first and second predetermined numbers of optical fiber sub-units and optical fibers, respectively, each comprise an integer.

It is, therefore, an object of the present invention to provide an improved optical fiber cable core.

It is another object of the present invention to provide an improved optical fiber cable core in which the packing density of the optical fibers within the cable core is maximized.

It is yet another object of the present invention to provide an improved optical fiber cable core which is simple in design and construction, is rugged and durable in use, and which is easy to use and maintain.

It is to these objects, as well as to the other objects, features and advantages of the present invention, which will become apparent upon reading the specification, when taken in conjunction with the accompanying drawings, to which the invention is directed.

DETAILED DESCRIPTION OF THE PREFERRED EMBODIMENTS

Figure 1:
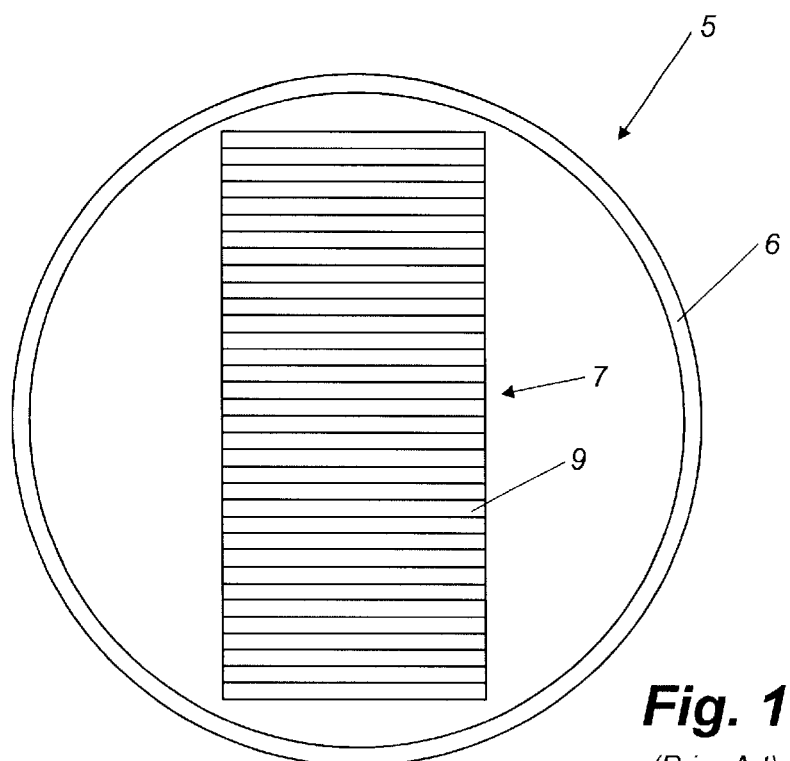
FIG. 1 is a cross-sectional view of a prior art optical fiber cable core.
Figure 2:
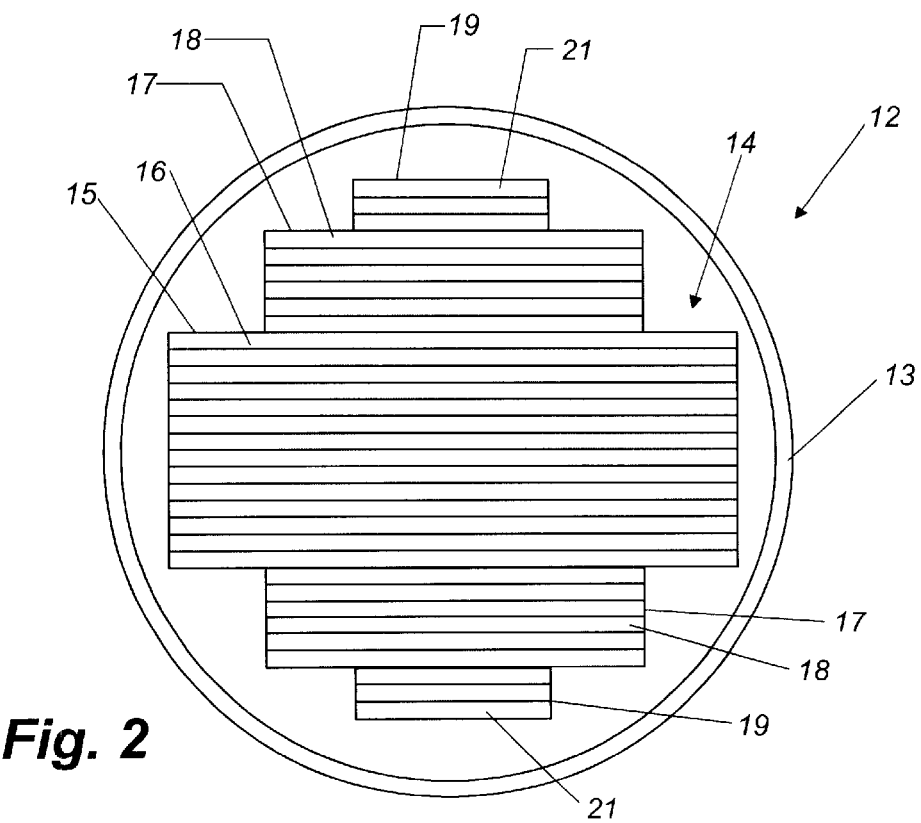
FIG. 2 is a cross-sectional view of a preferred embodiment of the variable fiber count optical fiber cable core of this invention.
Figure 3:
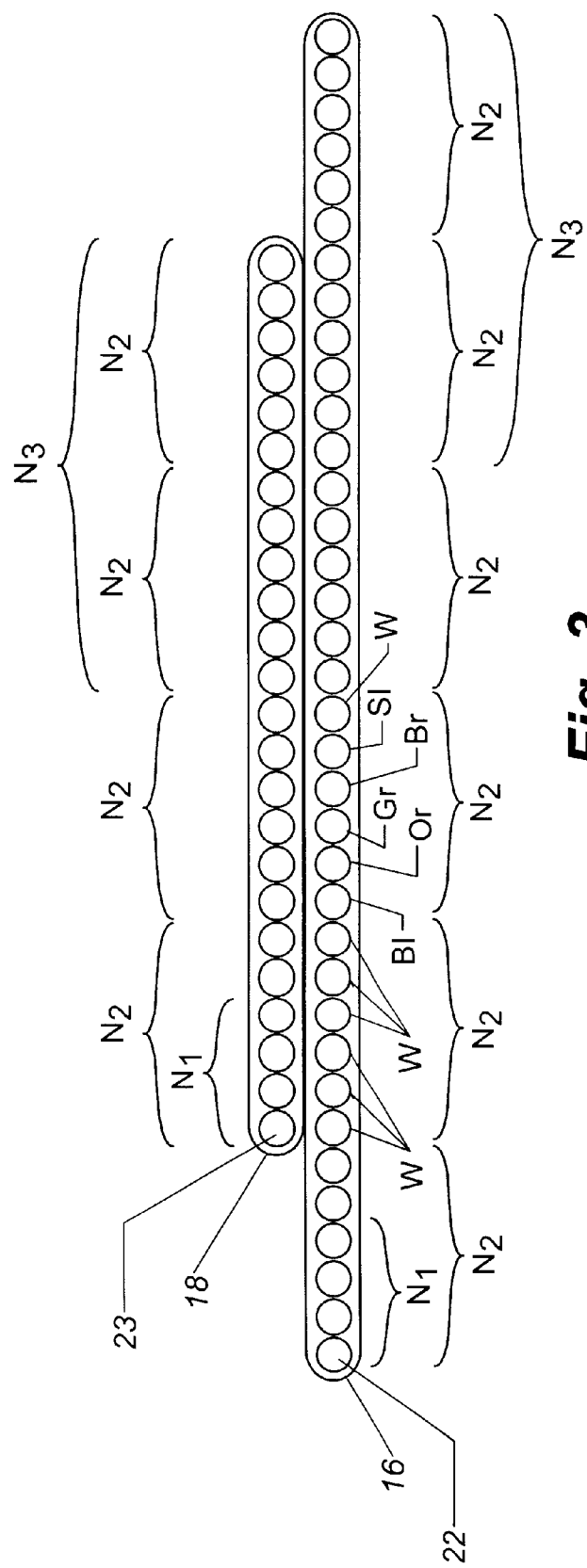
FIG. 3 is a schematic illustration of two of the optical fiber units which comprise a portion of the variable fiber count optical fiber cable core of this invention.
Figure 4:
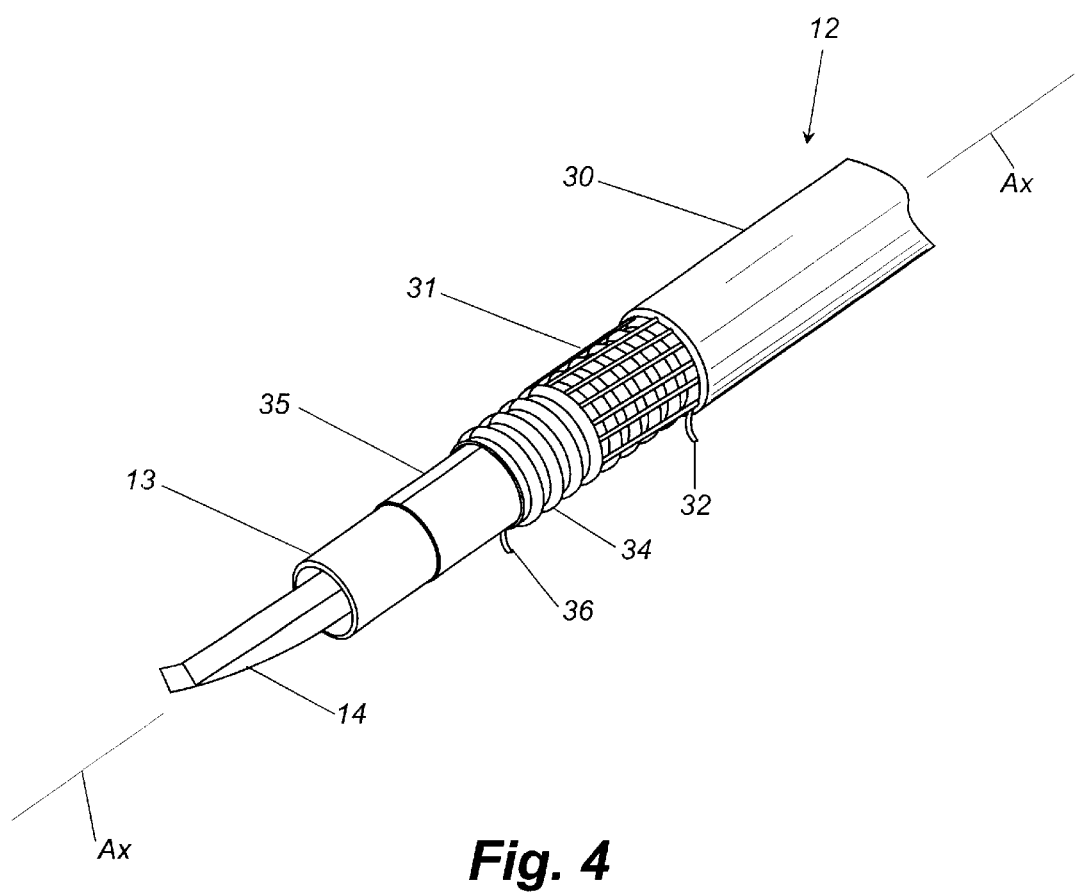
FIG. 4 is a partially cut away perspective view of an optical fiber cable utilizing the improved optical fiber cable core of this invention.

Referring now in details to the drawings, in which like reference characters indicate like parts throughout the several views, the improved optical fiber cable core of this invention is illustrated in FIGS. 2–4. As shown in FIGS. 2 and 4, an optical fiber cable 12 has a continuous elongate core tube 13 formed about a longitudinal axis "$A_x$" in which a stack 14 of a plurality. of optical fiber units 15, 17 and 19 are situated. In contrast to the prior art optical fiber cables, as illustrated in FIG. 1, described above, this improved optical fiber cable core configuration more efficiently utilizes, i.e., it maximizes, to the greatest extent possible within the known constraints of cable core design, the space present within the core tube 13.

Referring now to FIG. 2, the stack 14 of optical fiber units within this improved cable core is comprised of a first stack of optical fiber units 15, this stack being comprised of a plurality of optical fiber units 16, one of which is schematically illustrated in FIG. 3; a stack 17 of second optical fiber units 18, one of which is also illustrated in FIG. 3; and a stack 19 of a plurality of third optical fiber units 21. When referring to optical fiber units herein, I refer not only to optical fiber ribbons, but I also refer to any possible configuration of optical fibers bundled or configured as a unit of optical fibers, which may include, for example, tubular optical fiber units, as well as any other optical fiber unit design configurations which currently exist, or are yet to be developed for the purpose of fully implementing this invention. Here the stack of optical fiber units 14 of FIG. 2 differs from the stack of optical fiber units shown in FIG. 1 in that the number of optical fibers within the optical fiber units 16, 18, and 21 vary, rather than remain constant in each optical fiber unit, which variance allows for a larger stack of optical fiber units within the cable core, and thus maximizes the number of optical fibers present within the cable core. As shown in FIG. 2, the stack of optical fiber units is approximately cylindrically shaped, which offers a virtual ultimate optimum of fiber packing density while retaining the inherent flexibility and longitudinal degrees of freedom of motion provided by ribbons as the optical fiber units, in this instance.

As known, in high fiber count optical fiber cables there are several constraints that impose limitations on the core configuration, the cable sheath design, and the cable packaging, i.e., the number of optical fibers within the cable core. In the first instance, there exists a practical limitation that the optical fiber cable be easily installed within the standard 1¼" diameter cable ducts commonly found in use. Secondly, as the optical fiber cable fiber count increases, the duct constraints severely reduce the design space available to cable designers. Additionally, and as known, a minimum sheath thickness is required to provide acceptable tensile and compressive strength, handling robustness, and the ability to accommodate bending stresses. All of these factors act to constrain, or restrict, the inner diameter of the core tube. In addition, there must be a minimum amount of free volume within the core tube to allow substantially stress free movement of the optical fiber ribbons within the core tube as the cable is installed.

In order to optimize the number of optical fibers present within the cable core, the constraint of a fixed fiber count per optical fiber unit, in this instance ribbons, has been relaxed, and the method of determining the maximum number of optical fiber cables within the core requires that the feasible fiber counts always be integers, this can be accomplished by using a non-linear equation of constraint that specifies a minimum clearance between any optical fiber and the inner wall of the core tube, which factors are also incorporated into the governing equation, which is to maximize $N_T$, the number of optical fibers present within the core, where:

$$N_T = \sum_{i=1}^{m} n_i X_i$$

subject to the criteria that $X_i$ is an integer, and that i is equal to one, two . . . m, and where:

$$f_j(X_i, R_0, w_i, t_i) \leq C \; j=1,2\ldots i; \; i=1,2\ldots m$$

is also present within the above described equation. The character $n_i$ represents is the fiber count for an optical fiber unit, here a ribbon, of type i. The character $X_i$ is the number of optical fiber units of count $n_i$, and $f_j (X_i, R_0, W_i, t_i)$ represent a set of constraints for the minimum distance C from any fiber in the optical fiber unit from the core tube inner wall. This latter functional expression includes the core tube radius $R_0$, with $W_i$ and $t_i$ being the dimensions of the optical fiber units of the type i.

A simple example serves to clarify this general equation. Assume, for example, that three different fiber count optical fiber units are being used in a cable, for example ribbons of 36, 24, and 12 optical fibers within a given core tube of size $R_0$. It is desired to find the optimum number of ribbons of each of fiber count, and the maximum number of fibers that can be packaged within this arrangement, given a minimum clearance of between any fiber and the core tube wall. Accordingly, we have been given no and C, and wish to solve for the optimal number of 36, 24, and 12 fiber count ribbons in the cable core, as well as the resulting total fiber count.

This is illustrated schematically in FIG. 2, in which one optimal solution is to employ fourteen 36 fiber ribbons 16, twelve 24 fiber ribbons 18, and six 12 fiber ribbons 21, thereby forming a symmetrically disposed stack of 864 optical fibers within the given core tube diameter. A second core construction resulting in a cable core having 1176 optical fibers, using this formulation, would utilize twenty-six 36 fiber ribbons 16, twelve 24 fiber ribbons 18, and six 12 fiber ribbons 21.

In contrast, had optical fiber ribbons of a fixed fiber count, such as that shown in FIG. 1, been used, it would have been necessary to increase the core tube diameter by about 20% for the same fiber count of 864 optical fibers of the first construction described above, due primarily to the fact that the available space increases as the square of the core tube diameter, and the use of variable fiber count ribbons, or optical fiber units, more preferably, becomes more effective as the diameter increases. This application may also be used where the cable cores is a composite of several different fiber types; for example there may be multi mode and single mode optical fibers that together form the stack of optical fibers, or optical fiber units, within the optical fiber cable core 14 of this invention.

Having derived a mathematical equation for optimizing the configuration of the optical fiber units within the tube, it is useful to distinguish between the mathematical and practical optimal core configurations. Specifically, it is not feasible to design an optical cable core for every fiber count because users prefer to deploy a minimum number of cable sizes, so a given optical fiber cable must typically accommodate a range of fiber counts, and must be compatible with pre-existing sets of industry standard cable and ribbon sizes. These initial boundary conditions may significantly influence how a family of optical fiber cable core designs is extended to higher fiber counts.

FIG. 3 illustrates a first optical fiber unit, or ribbon, 16 and a second optical fiber unit, or ribbon, 18 of the types used in the stack 14 of optical fiber units illustrated in FIG. 2. Here each of the optical fiber units 16, 18, is formed as an optical fiber ribbon, although other optical fiber unit types are anticipated. The first optical fiber unit 16 is comprised, therefore, of an array of optical fibers 22, and the second optical fiber unit 18 is also comprised, in similar fashion, of an array of optical fibers 23. For each of the optical fiber units 16, 18, however, as well as for the third optical fiber unit 21, which is not illustrated in greater detail in FIG. 3, a predetermined number of optical fiber sub-units, denoted by the reference characters $N_1$, $N_2$, $N_3$ are disclosed.

The illustration of the three optical fiber sub-units N within the one optical fiber unit are provided here for illustrative purposes only, it being understood that the predetermined number "N" of optical fiber sub-units which comprises the optical fiber unit will typically be of a single type or configuration for the entire optical fiber unit. For example, the optical fiber ribbon 16 may be comprised of 9 sub-units $N_1$, or 6 sub-units $N_2$, or 3 sub-units $N_3$, which are comprised of 4, 6, and 12 optical fibers, respectively. The same holds true for the second optical fiber unit 18, namely it will be comprised of a plurality of sub-units $N_1$, or sub-units $N_2$, or sub-units $N_3$, to the exclusion of other types of sub-units within the optical fiber ribbon.

In keeping with the formulation described above, therefore, there will be a first predetermined number of optical fiber sub-units N present within the optical fiber units of the cable core, and there will be a second predetermined number of optical fibers 22, 23, present within each sub-unit of optical fibers which together comprise the optical fiber units present in the stack of optical fibers 14 shown in FIG. 2. The total number of optical fibers, and the optimum design of the cable core, will result from employing the formula described above in combination with known criteria, namely the number of sub-units, the number of optical fibers, the number of optical fiber units, the minimal distance of the stack of optical fiber units from the inner core tube wall, and the core tube diameter (radius) resulting in the design of the cable core configuration.

Still referring to FIG. 3, it is anticipated that the optical fibers 22, 23, respectively within the optical fiber units 16, 18 may each be colored identically, as shown for example for the second sub-unit $N_2$ of optical fibers for the first ribbon 16, or may be colored differently from one another within the sub-unit, as shown in the third sub-unit $N_2$ of optical fiber unit 16, in which, in order, a blue, an orange, a green, a brown, a slate, and a white optical fiber are present for ease of identifying the optical fibers when splicing and installing the optical fiber cables, and/or for identifying the types of optical fibers present therein.

Although it is not shown in greater detail in FIG. 3, it is anticipated that the sub-units N present within the optical fiber units may each comprise differing types of optical fibers. For example, the first sub-unit $N_2$ of optical fiber unit 16 may comprise multi mode optical fibers, whereas the second sub-unit $N_2$ may comprise single mode optical fibers, and then the third sub-unit $N_2$ may comprise match clad optical fibers, with the remainder of the sub-units being multi mode, single mode or match clad optical fibers, all as desired. Moreover, it is also anticipated that, where, for example the sub-units each comprise different types of optical fiber cables, that each sub-unit may have a constant color throughout the sub-unit, which color differs from the colors, or lack thereof, of the other sub-units, for identifying the type of optical fiber therein. In this example, therefore, multi mode optical fibers may be white, whereas single mode optical fibers may be orange, and match clad optical fibers may be slate colored, all for the purposes of identifying either the types of optical fibers, or the optical fiber itself for use in installing and/or splicing the optical fiber cables during installation and service. It is understood that although the third optical fiber unit 21 of FIG. 2 is not illustrated, it is comprised of 12 optical fibers of the type shown in FIG. 3, and will thus be comprised of three sub-units, $N_1$, or two sub-units $N_2$, or only a single sub-unit $N_3$, when compared to the first and second optical fiber units 16, 18, respectively.

The optical fiber cable 12 of this invention is also illustrated in FIG. 4, which shows the core tube 13, and in which the stack of optical fiber units 14 disposed. The optical fiber cable is constructed of an exterior polyethylene jacket 30, which overlies a radially spaced series of dielectric strength members 31. Laying between selected ones of the dielectric strength members are elongate rip cords 32, which are provided for tearing the exterior polyethylene jacket when it is desired to gain access to the interior of the cable, and more specifically the cable core during splicing of optical fiber cables, and/or servicing the same.

In known fashion, the optical fiber cable may be provided with ECCS armor, or other suitable types of armor, which underlies the dielectric strength members, and which overlies a continuously wound water blocking tape 35 wrapped about the exterior periphery of the core tube. Another series of rip cords 36 will underlie the ECCS armor and overlie the water blocking tape, and are provided for being grasped and pulled downwardly for exposing the water blocking tape underneath the ECCS armor, whereupon the water blocking tape may be cut and access to the cable core tube 13 gained.

So constructed, the optical fiber cable 12 illustrated in FIG. 4 is a metallic or armored version of the 864 optical fiber cable 12 illustrated schematically in FIG. 2. It is understood, however, that the optical fiber cable 12 need not be metallic or armored, and could be comprised only of the exterior polyethylene jacket, the dielectric strength members, the water blocking tape, and the requisite rip cords.

It is also anticipated that the optical fibers within each optical fiber sub-unit will be adhered to one another, whereas the sub-units will be more weakly adhered to one another such that the sub-units can be easily separated from one another during cable splicing and/or installation, for ease of service, maintenance, installation in the field. Again, this, taken in conjunction with the coloration of the optical fibers within the sub-units, and/or the identity of the types of optical fibers within the sub-units, provides a greater degree of flexibility, usability, and maintainability, than the known types of optical fiber cable core configurations.

Although several preferred embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein, and that many modifications and other embodiments of the inventions are intended to be included within the scope of the appended claims. Moreover, although specific terms are employed herein, as well as in the claims, they are used in a generic and descriptive sense only, and not for the purposes of limiting the described invention, nor the claims which follow below.

I claim:

1. A variable fiber count optical fiber cable core for use as a part of an optical fiber cable, the optical fiber cable having an elongate cylindrical core tube formed symmetrically about a longitudinal axis within which the cable core is received, said cable core comprising:

at least a first optical fiber unit having a first predetermined number of optical fiber therein; and at least a second optical fiber unit having a second predetermined number of optical fibers therein;

at least a third optical fiber unit having a third predetermined number of optical fibers therein;

said first predetermined number of optical fibers differing from said second predetermined number of optical fibers and said at least first and second optical fiber units, respectively, being formed as a stack of optical fiber units within the core tube said third predetermined number of optical fibers differing from both of said first and second predetermined numbers of optical fibers, respectively;

said third optical fiber unit being stacked with said at least a first optical fiber unit and said at least a second optical fiber unit, respectively, as a part of said stack of optical fiber units;

wherein said first predetermined number of optical fibers comprises thirty-six optical fibers, said second predetermined number of optical fibers comprises twenty-four optical fibers, and said third predetermined number of optical fibers comprises twelve optical fibers;

and wherein said stack of optical fiber units comprising fourteen of said first optical fiber units, twelve of said second optical fiber units, and six of said third optical fiber units, respectively.

2. The cable core of claim 1, wherein each of said at least a first and a second optical fiber units, respectively, comprises a first predetermined number of optical fiber sub-units-joined together as a single optical fiber unit, each of said optical fiber sub-units being- comprised of a second predetermined number of optical fibers, wherein said first predetermined number of optical fiber sub-units and said second predetermined number of optical fibers within each said sub-unit each comprise integers.

3. The cable core of claim 2, wherein said second predetermined number of optical fibers per each said sub-unit is at least two.

4. The cable core of claim 2, wherein there are at least twelve optical fibers within each said optical fiber sub-unit.

5. The cable core of claim 2, wherein at least some of the optical fibers within at least one of said optical fiber sub-units are colored differently than the remainder of the optical fibers within said at least one optical fiber sub-unit.

6. The cable core of claim 2, wherein at least one of said optical fiber sub-units is further comprised of a plurality of optical fibers colored differently than one another within said sub-unit.

7. The cable core of claim 1, wherein each of said at least a first and each of said at least a second optical fiber units, respectively, comprises a planar array of optical fibers joined together and formed as a ribbon of optical fibers.

8. The cable core of claim 1, wherein said stack of optical fiber units is formed symmetrically about the longitudinal axis of the cable tube.

9. The cable core of claim 1, wherein said stack of optical fiber units approximates a cylindrically shaped stack of optical fiber units within the core tube of the optical fiber cable.

10. A variable fiber count optical fiber cable core for use as a part of an optical fiber cable, the optical fiber cable having an elongate cylindrical core tube formed symmetrically about a longitudinal axis within which the cable core is received, said cable core comprising:

at least a first optical fiber unit having a first predetermined number of optical fibers therein; and at least a second optical fiber unit having a second predetermined number of optical fibers therein;

at least a third optical fiber unit having a third predetermined number of optical fibers therein;

said first predetermined number of optical fibers differing from said second predetermined number of optical fibers and said at least first and second optical fiber units, respectively, being formed as a stack of optical fiber units within the core tube said third predetermined number of optical fibers differing from both of said first and second predetermined numbers of optical fibers, respectively;

said third optical fiber unit being stacked with said at least a first optical fiber unit and said at least a second optical fiber unit, respectively, as a part of said stack of optical fiber units;

wherein said first predetermined number of optical fibers comprises thirty-six optical fibers, said second predetermined number of optical fibers comprises twenty-four optical fibers, and said third predetermined number of optical fibers comprises twelve optical fibers;

and wherein said stack of optical fiber units comprises twenty-six of said first optical fiber units, twelve of said second optical fiber units, and four of said third optical fiber units, respectively.

11. The cable core of claim 10, wherein each of said at least a first and a second optical fiber units, respectively, comprises a first predetermined number of optical fiber sub-units joined together as a single optical fiber unit, each of said optical fiber sub-units being comprised of a second predetermined number of optical fibers, wherein said first predetermined number of optical fiber sub-units and said second predetermined number of optical fibers within each said sub-unit each comprise integers.

12. The cable core of claim 11, wherein said second predetermined number of optical fibers per each said sub-unit is at least two.

13. The cable core of claim 11, wherein there are at least twelve optical fibers within each said optical fiber sub-unit.

14. The cable core of claim 11, wherein at least some of the optical fibers within at least one of said optical fiber sub-units are colored differently than the remainder of the optical fibers within said at least one optical fiber sub-unit.

15. The cable core of claim 11, wherein at least one of said optical fiber sub-units is further comprised of a plurality of optical fibers colored differently than one another within said sub-unit.

16. The cable core of claim 10, wherein each of said at least a first and each of said at least a second optical fiber units, respectively, comprises a planar array of optical fibers joined together and formed as a ribbon of optical fibers.

17. The cable core of claim 10, wherein said stack of optical fiber units is formed symmetrically about the longitudinal axis of the cable tube.

18. The cable core of claim 10, wherein said stack of optical fiber units approximates a cylindrically shaped stack of optical fiber units within the core tube of the optical fiber cable.

19. A variable fiber count optical fiber cable core for use as a part of an optical fiber cable, the optical fiber cable having an elongate cylindrical core tube formed symmetrically about a longitudinal axis within which the cable core is received, said cable core comprising:

at least a first optical fiber unit having a first predetermined number of optical fibers therein; and at least a second optical fiber unit having a second predetermined number of optical fibers therein;

at least a third optical fiber unit having a third predetermined number of optical fibers therein;

said first predetermined number of optical fibers differing from said second predetermined number of optical fibers and said at least first and second optical fiber units, respectively, being formed as a stack of optical fiber units within the core tube said third predetermined number of optical fibers differing from both of said first and second predetermined numbers of optical fibers, respectively;

said third optical fiber unit being stacked with said at least a first optical fiber unit and said at least a second optical fiber unit, respectively, as a part of said stack of optical fiber units;

wherein said stack of optical fiber units is formed of a first plurality of said third optical fiber units, a first plurality of said second optical fiber units joined thereto, a plurality of said first optical fiber units joined to said first plurality of second optical fiber units, a second plurality of second optical fiber units joined to said first optical fiber units, and a second plurality of third optical fiber units joined to said second plurality of second optical fiber units, symmetrically about the longitudinal axis of the cable tube;

and wherein each of said first and second pluralities of said third optical fiber units comprise at least three of said third optical fiber units, wherein each of said first and second pluralities of said second optical fiber units comprise at least six of said second optical fiber units, and wherein said plurality of said first optical fiber units comprises at least fourteen of said first optical fiber units.

* * * * *